United States Patent [19]

Roth et al.

[11] 3,989,538

[45] Nov. 2, 1976

[54] SEALED LITHIUM-REDUCIBLE GAS CELL

[75] Inventors: Walter L. Roth, Schenectady; Gregory C. Farrington, Elnora, both of N.Y.

[73] Assignee: General Electric Company, Schenectady, N.Y.

[22] Filed: Mar. 19, 1975

[21] Appl. No.: 559,901

[52] U.S. Cl. .............................. 429/101; 429/191; 429/212; 429/218
[51] Int. Cl.² ................................ H01M 10/34
[58] Field of Search ............... 136/6 LN, 6 FS, 6 S

[56] References Cited
UNITED STATES PATENTS

| | | | |
|---|---|---|---|
| 3,535,163 | 10/1970 | Dzieciuch et al. | 136/6 FS |
| 3,578,500 | 5/1971 | Maricle | 136/6 LN |
| 3,892,589 | 7/1975 | Rosansky et al. | 136/6 LN |
| 3,895,963 | 7/1975 | McGowan | 136/6 FS |

Primary Examiner—John H. Mack
Assistant Examiner—H. A. Feeley
Attorney, Agent, or Firm—Paul R. Webb, II; Joseph T. Cohen; Jerome C. Squillaro

[57] ABSTRACT

A sealed lithium-reducible gas cell is described which comprises a casing, an anode positioned within the casing, the anode selected from the class consisting of lithium, lithium as an amalgam, and lithium in a non-aqueous electrolyte, a cathode positioned within the casing, the cathode consisting of a reducible gas in a non-aqueous electrolyte with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO \cdot 9Al_2O_3$ of which 1.3 to 85% of the total alkali ion content is lithium.

4 Claims, 3 Drawing Figures

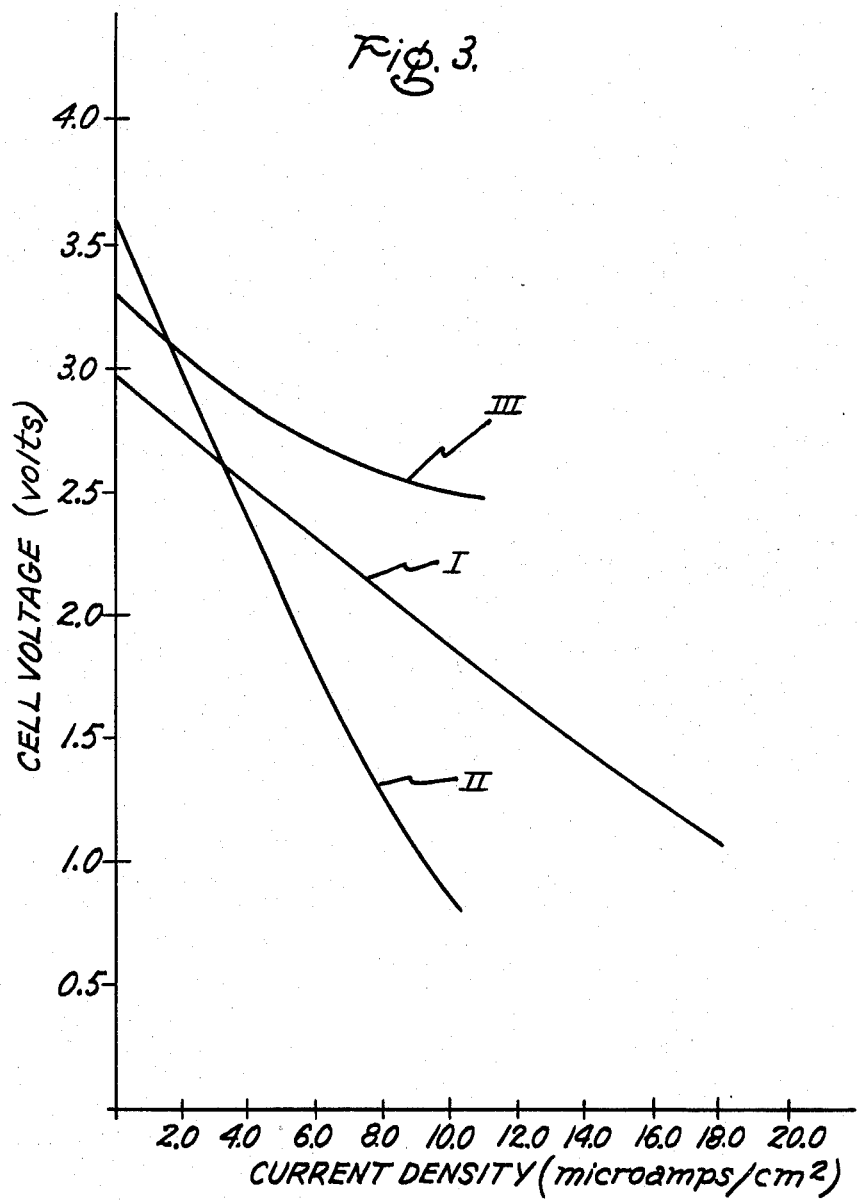

SEALED LITHIUM-REDUCIBLE GAS CELL

This invention relates to sealed cells and, more particularly, to such cells employing a lithium anode, a reducible gas cathode, and a solid lithium-sodium aluminate electrolyte.

Cross-reference is made to copending patent applications Ser. Nos. 517,511, 517,512 and 517,513 filed Oct. 24, 1974, and now abandoned in the names of Gregory C. Farrington and Walter L. Roth and entitled "Sealed Lithium-Bromine Cell", "Sealed Lithium-Iodine Cell", and "Sealed Lithium-Chlorine Cell", respectively.

Cross-reference is made to copending patent applications Ser. Nos. 557,583 and 557,484 filed March 12, 1975 now U.S. Pat. Nos. 3,953,228 and 3,953,229, respectively both issued Apr. 27, 1976 and Ser. No. 559,990 filed March 19, 1975 now U.S. Pat. No. 3,953,233 issued Apr. 27, 1976 in the names of Walter L. Roth and Gregory C. Farrington and entitled "Sealed Lithium-Reducible Sulfur Oxyhalide Cell", "Sealed Lithium-Reducible Phosphorous Oxyhalide Cell", and "Sealed Lithium-Sulfur Monochloride Cell", respectively.

In Weininger et al. U.S. Pat. No. 3,573,107, there is described a rechargeable non-aqueous alkali metal-halogen electrochemical cell which includes an alkali metal anode, a halogen cathode, a non-aqueous electrolyte, and an ionpermeable barrier between the electrodes to inhibit migration of halogen to the negative electrode. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al. barrier. The electrolyte of the present invention permits cell operation at temperatures above the polymer barrier stability of Weininger et al.

In Liang U.S. Pat. No. 3,713,897, there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. Our electrolyte is not prone to destruction in non-aqueous solvents as opposed to the Liang patent material.

In "Progress in Solid State Chemistry", No. 7, edited by A. Reiss and J. O. McCaldin, published by Pergamon Press in 1972, there is a Section 5 entitled "$\beta$-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between $\beta$-alumina and various binary nitrate melts containing $NaNO_3$ and another metal nitrate at 300°–350° C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lilthium ions in a melt of $LiNO_3$-$LiCl$. Throughout the above Kummer publication there is no recognition that the lithium-sodium $\beta$-alumina produced by equilibration of sodium beta-alumina with molten $LiNO_3$ is a unique and stable compound which can readily transport lithium ions.

There is presently available on the market a primary lithium cell which comprises a lithium anode immersed directly in an acetonitrile electrolyte containing dissolved sulfur dioxide. There is no barrier between the lithium and the sulfur dioxide. The sulfur dioxide passivates lithium but can be easily reduced at a carbon cathode. The passivity of lithium in the presence of sulfur dioxide provides a low self-discharge rate at low temperatures. Self-discharge increases with increasing temperature. The cell becomes completely unstable at the melting point of lithium, 181° C.

As opposed to the above described commercially available lithium cell, the present invention relates to a sealed lithium-reducible gas cell which has a substantially different structure. The present invention is a sealed cell in which the anode is selected from the class of lithium, lithium as an amalgam, and lithium in a non-aqueous electrolyte. The present invention has a solid barrier electrolyte of a solid lithium-sodium aluminate ion-conductive material as opposed to the liquid electrolyte of the above-described cell construction.

In the above described cell, the electrolyte is in direct contact with both the sulfur dioxide cathode and the lithium anode with no separator therebetween. The anode is merely passivated by the sulfur dioxide. Thus, the sealed lithium-reducible gas cell of the present application is substantially different from the above-described cells.

Our present invention is directed to a sealed lithium-reducible gas cell with positive separation of the anode and cathode by a solid lithium-sodium aluminate electrolyte which is lithium ion conductive.

The primary object of our invention is to provide a sealed lithium-reducible gas cell which has high cell voltage, high energy density, a near-zero self-discharge rate, exceptionally long storage life, and stability at elevated temperatures.

In accordance with one aspect of our invention, a sealed lithium-reducible gas cathode employs a lithium anode, a reducible gas cathode, and a solid lithium-sodium aluminate electrolyte which is a lithium-ion conductor therebetween.

These and various other objects, features and advantages of the invention will be better understood from the following description taken in connection with the accompanying drawing in which:

FIG. 3 is a set of polarization curves showing cell performances of the cell shown in FIGS. 1 and 2.

Figure 1:
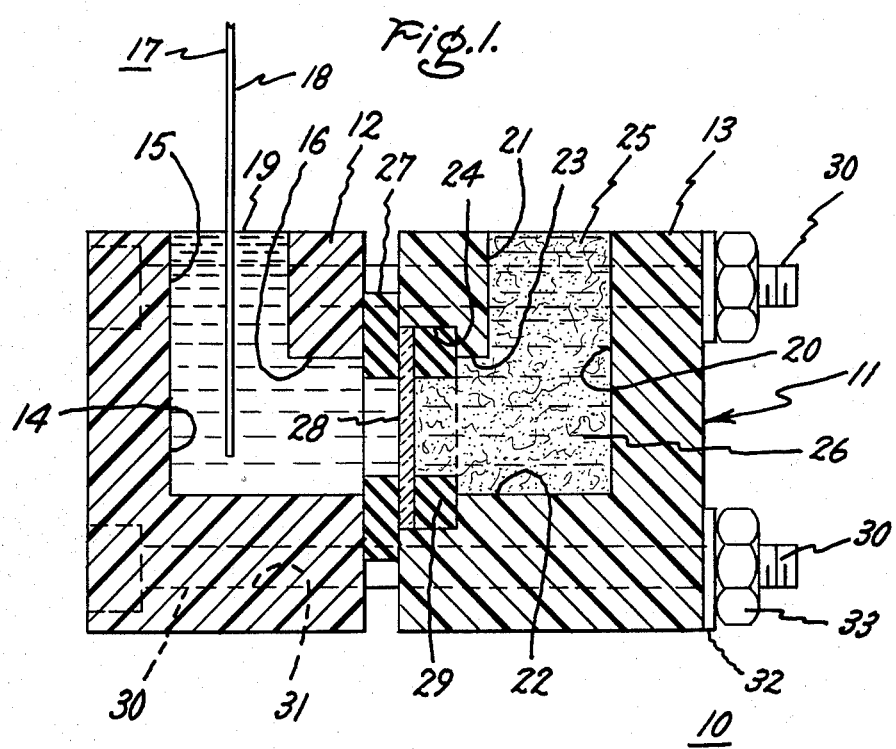
FIG. 1 is a sectional view of a lithium-reducible gas cell made in accordance with our invention.

In FIG. 1 of the drawing, there is shown generally at 10 a lithium-reducible gas cell embodying our invention. While we tested this open cell for operability, the cell for general use is sealed. The cell has a two part Teflon polymer casing 11 including an anode portion 12 and a cathode portion 13. Anode portion 12 defines a chamber 14 therein with an upper opening 15. An opening 16 is provided in one side wall. An anode 17 comprises a lithium metal foil 18 in a non-aqueous electrolyte or solvent 19 within chamber 4. Cathode portion 13 defines a chamber 20 therein with an upper opening 21. An opening 22 is provided in one side wall, which opening 22 is shown with a first portion 23 and a recessed portion 24. A cathode 25 comprises a reducible gas of sulfur dioxide in propylene carbonate containing $LiClO_4$ and tetrabutylammonium tetrafluoroborate. Carbon felt 26 is also positioned within chamber 20 as a current collector. Appropriate electrical leads (not shown) are connected to anode 17 and cathode 25. Two part casing 11 has its anode portion 12 and cathode portion 13 positioned adjacent to one another and in communication with one another in a leak-proof manner by aligning openings 16 and 22 and positioning between the two portions a washer 27, for example, of silicone rubber. A solid lithium-sodium aluminate electrolyte 28 in the form of a disc is positioned against the outer surface of washer 27 and the outer surface of a similar silicone washer 29 fitted within recess 24 of opening 22. The two part casing 11 is held together tightly and in a leak-proof fashion by employing a pair of threaded fasteners 30 which extend through an appropriate opening 31 through both parts of casing 11. A washer 32 and a nut 33 are provided for the threaded end of each fastener to position the structure together. The above assembly results in a lithium-reducible sulfur oxyhalide cell which can be employed as a primary cell.

Figure 2:
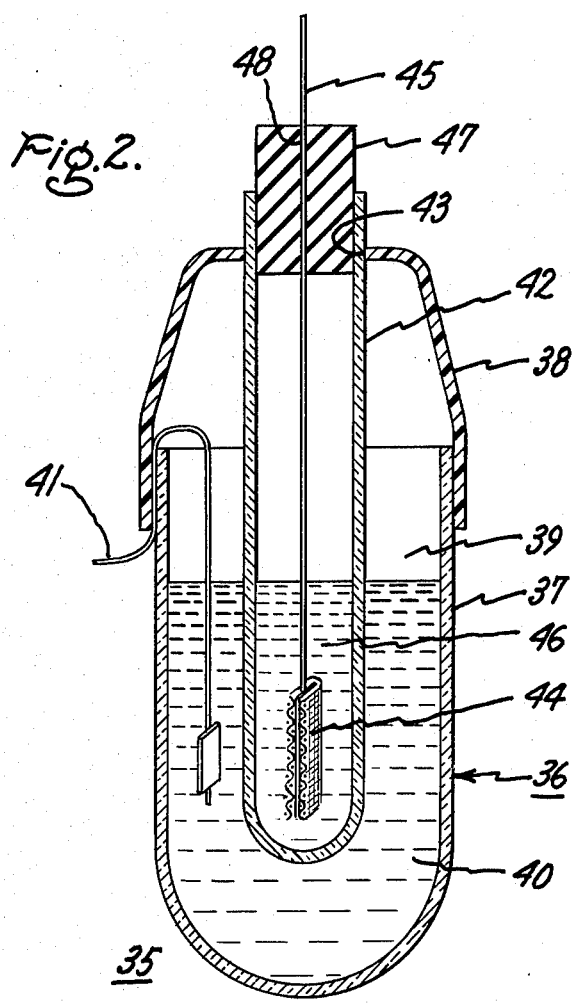
FIG. 2 is a sectional view of a modified lithium-reducible gas cell made in accordance with our invention.

In FIG. 2 of the drawing there is shown generally at 35 a modified sealed lithium-reducible gas cell embodying our invention. An outer casing 36 comprising a lower casing portion 37 of glass and an upper casing portion 38 of polyethylene affixed tightly to the upper open end of the lower casing portion 37 thereby provides a chamber 39 for a cathode 40 of sulfur dioxide in a non-aqueous electrolyte with an ionic conductivity enhancing material. An electrical lead 41 in the form of a platinum wire or graphite filament is immersed in cathode 40 and extends to the exterior of cell 35 through the junction of the lower and upper casing portions 37 and 38. An inner casing 42 in the form of a tube of solid lithium-sodium aluminate electrolyte is positioned within casing 37 and immersed partially in cathode 40. An opening 43 is provided in the top of upper casing portion 38 into which tube 42 fits tightly. An anode 44 of lithium metal in the form of a lithium ribbon pressed onto a nickel mesh is folded together and attached to the end of a nickel electrical lead 45. An anolyte 46 partially fills tube 42 and is in contact with a lithium anode 44. An electrically insulating closure 47 with a hole 48 therethrough is provided at the upper end of tube 42 to seal the initially open end of the tube. Lead 45 extends through hole 48 in closure 47 to the exterior of cell 35.

In FIG. 3, performances of the cells shown in FIGS. 1 and 2, respectively, are provided by polarization curves. In this Figure, cell voltage in volts is plotted against current density in microamperes per square centimeter.

We found that we could form a sealed lithium-reducible gas cell with a lithium ion-conductive electrolyte by employing a casing having a cathode portion and an anode portion. These two portions are separated by a solid lithium-sodium aluminate electrolyte in disc or tube form which will be further described below. Such a casing may be provided in various configurations such as, for example, shown in FIGS. 1 and 2. For purposes of showing the operability of our cell, we used first an anode portion and a cathode portion each of which had top and side openings as shown in FIG. 1. Since it was not necessary, the top openings were not sealed during assembly and testing. The casing material chosen was Teflon polymer. A silicone rubber washer was positioned in the recessed opening of the cathode portion and a solid lithium-sodium electrolyte was positioned adjacent the washer within the recessed opening. A silicone rubber washer was positioned between the casing portions. The side openings of the casing portions and the washers were aligned to provide for contact of the cathode with one surface of the solid electrolyte and for contact of the anode with the other surface of the electrolyte. We employed threaded fasteners to hold the casing portions together in a unitary cell structure. It will, of course, be appreciated that various other cell configurations can be employed, for example, as shown in FIG. 2. In addition to the Teflon polymer casing material, various metals and non-metals can be used. Other materials can be substituted for the silicone washers. If desired, in the configuration, the solid electrolyte disc could be sealed by glass seals to the casing to separate the cathode from the anode as shown, for example, in above-mentioned U.S. Pat. No. 3,817,790.

We found further that we could form various modified sealed lithium-reducible gas cells embodying our invention. One such modified cell employs an outer casing comprising a lower casing portion of glass and an upper casing portion of a plastic such as polyethylene affixed tightly to the upper open end of the lower casing portion thereby providing a chamber for a cathode. An electrical lead in the form of a platinum wire or graphite filament is immersed in the cathode and extends to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium metal in the form such as lithium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

For the anode we employ lithium, lithium as an amalgam or lithium in a non-aqueous electrolyte. For the cathode we can employ a reducible gas in a non-aqueous solvent with an ionic conductivity enhancing material. We employ a solid lithium-sodium aluminate electrolyte between the cathode and anode to provide a solid barrier preventing contact between the electrodes and to provide lithium ion-conductivity.

We can form solid lithium-sodium ion-conductive electrolytes with an approximate composition of $LiNaO \cdot 9Al_2O_3$ of which 1.3 to 85 percent of the total alkali content is lithium. As it was discussed above in "Progress and Solid State Chemistry", J. T. Kummer, in Section 5 is described a lithium-sodium β-alumina material, particularly on pages 149–151. Further, it is described in the article how to manufacture such material. As it will be particularly noted throughout the above Kummer publication, there is no recognition that the lithium-sodium β-alumina produced by equilibration of sodium beta-alumina with molten $LiNO_3$ is a unique and stable compound which can readily transport lithium ions. We used such material containing 50 percent lithium ions as a solid electrolyte in our initial cell as shown in FIG. 1 and described above. The results of performance of this cell are shown in FIG. 3. Such electrolyte material containing 50 percent lithium ions appears to be the optimum amount of lithium ions in the material.

A range of 40 to 60 percent lithium ions in the electrolyte material with the remainder sodium ions provides the desirable conductivity for the operation of our cells. We found that we could obtain the desirable conductivity necessary for the operation of our cells by employing a broader range of 1.3 to 85 percent lithium ions in the electrolyte material with the remainder sodium ions. Tubes made of solid lithium-sodium aluminate electrolyte containing, respectively, 1.34 and 84.7 percent sodium ion substitution by lithium ions were used in later cells as shown in FIG. 2 and as described above. The results of performance of these cells are shown in FIG. 3.

We found further that for the cathode we could employ a reducible gas reasonably soluble and stable in a non-aqueous electrolyte with various ionic conductivity enhancing materials, such as chemically stable conductive salts. Suitable reducible gases include sulfur dioxide, $SO_2$; nitrogen dioxide, $NO_2$; nitrogen pentoxide, $N_2O_5$; etc. Suitable non-aqueous electrolytes include propylene carbonate, butyrolactone, tetrahydrofuran, and acetonitrile. Various ion conductivity enhancing materials include chemically stable salts such as lithium and tetraalkylammonium chlorides, bromides, perchlorates, cyanides, thiocyanates, tetrafluoroborates and hexafluoroarsenates.

Lithium is the lightest practical solid battery anode material and is also the most reducing. The lithium ion is a small and strongly polarizing ion. The salts of the lithium ions are generally more soluble in non-aqueous solvents than their sodium ion counterparts. Such high solubility helps eliminate salt precipitation on the faces of a solid electrolyte. Various non-aqueous electrolytes which are suitable with lithium include propylene carbonate, butyrolactone, tetrahydrofuran and acetonitrile.

Examples of lithium-reducible gas cells, which can be readily sealed or are sealed, made in accordance with our invention are set forth below:

EXAMPLE I

One cell, No. I, was assembled as generally described above and shown in FIG. 1 of the drawing. For the cell, a lithium-sodium aluminate electrolyte disc was made by first preparing a cylinder of β-alumina by firing $Na_2O+Al_2O_3$ plus 1 percent $M_gO$ at 1750° C. The density of the β-alumina cylinder was 3.224 g/cm³ corresponding to less than 1 percent void volume. Two discs of 1 mm thickness each were sliced from the cylinder and converted to a lithium-sodium aluminate electrolyte by immersion in molten $LiNO_3$ at 400° C for 24 hours. The exchange of the sodium ions for the lithium ions was accompanied by a 1.91 percent decrease in weight corresponding to approximately 50 percent sodium ion substitution by lithium ions and the final density was 3.148 g/cm³. X-ray diffraction showed that each electrolyte disc has a hexagonal crystal structure with lattice parameters $a = 5.603 \pm 0.001$ A and $c = 22.648 \pm 0.003$ A.

A two part Teflon polymer casing which included an anode portion and a cathode portion was employed to assemble the cell. Each portion had a chamber with an upper opening and a side opening. The side opening in one portion, the cathode portion, was further recessed. A silicone washer was positioned in the side opening of the cathode portion. The above prepared lithium-sodium aluminate electrolyte disc was positioned against the washer and within the recessed opening in the cathode portion. A silicone washer was positioned between the casing portions and the openings in the washer and in the casing portions were aligned. A pair of threaded fasteners were then employed to hold the casing portions together and tightened at one end by nuts. The chamber of the anode portion for the cell was provided with an anode consisting of a lithium foil inserted in an electrolyte of propylene carbonate. A reducible gas of sulfur dioxide was present as solution in propylene carbonate containing $LiClO_4$ and tetrabutylammonium tetrafluoroborate as the cathode. Carbon felt was fitted into the chamber within the cathode portion to provide a current collector. This structure resulted in a lithium-reducible gas cell made in accordance with our invention which cell could be readily sealed. The open circuit voltage of cell No. I was 2.8 volts at 26° C.

EXAMPLE II

The performance of the cell, No I, of Example I, is shown in the polarization curves in FIG. 3 of the drawing which was produced at a temperature of 26° C. The cell voltage in volts is plotted against current in microamperes per square centimeter for the cell, No. I.

No attempts were made to minimize interfacial polarization at the lithium-sodium aluminate ion-conductive electrolyte interfaces.

EXAMPLES III and IV

Two cells, Nos. II and III, were assembled as generally described above and as shown in FIG. 2 of the drawing. The cells were constructed in the same manner with the exception that one lithium-sodium aluminate tube, No. II, had an 84.7 percent lithium ion content while the other lithium-sodium aluminate tube, No. III, had a 1.34 percent lithium ion content. The remaining alkali ion content of each tube was sodium ions.

The tube for cell No. II was formed from a tube of sodium β-alumina approximately 6.2 cm. long, 1.1 cm. OD, and 0.15 cm. wall thickness. The tube was baked out overnight at 1175° C prior to lithium ion exchange. The lithium ion exchange was made by immersion in lithium nitrate at 600° C for 13 hours. A resulting 3.12 percent weight decrease corresponded to 84.7 percent sodium substitution by lithium ions.

The tube for cell No. III was formed from an identical sodium β-alumina tube which was baked out in the same manner. The lithium ion exchange was made by immersion in 20 mole percent lithium nitrate and 80 mole percent sodium nitrate at 400° C for 72 hours. A resulting 0.049 percent weight decrease corresponded to 1.34 percent sodium substitution by lithium ions.

For each cell, an outer casing was formed of a lower casing portion of glass and an upper casing portion of polyethylene affixed tightly to the upper open end of the lower casing portion thereby providing a chamber for the cathode of sulfur dioxide in propylene carbonate containing LiClO$_4$ and tetrabutylammonium tetrafluoroborate. An electrical lead in the form of a platinum wire was immersed in the cathode and extended to the exterior of the cell through the junction of the lower and upper casing portions. An inner casing in the form of a tube of solid lithium-sodium aluminate electrolyte was positioned within the outer casing and immersed partially in the cathode. The tube for cell No. II contained 84.7 percent lithium ion content while the tube for cell III contained 1.34 percent lithium ion content. An opening was provided in the top of each upper casing portion into which the respective tube fitted tightly. An anode of lithium metal in the form of a lithium metal ribbon pressed onto a nickel mesh was folded together and attached to the end of a nickel electrical lead. An anolyte of propylene carbonate partially filled each tube and was in contact with the lithium anode. An electrically insulating closure with a hole therethrough was provided at the upper end of each tube to seal the initially open end of the tube. The lead extended through the hole in the closure to the exterior of the cell. These structures resulted in two sealed lithium-reducible gas cells made in accordance with our invention.

EXAMPLES V and VI

The performance of the cells, Nos. II and III, of Examples III and IV, are shown in the polarization curves in FIG. 3 of the drawing which were produced at a temperature of 26° C. The cell voltage in volts is plotted against current in microamperes per square centimeter for each cell.

No attempts were made to minimize interfacial polarization at the lithium-sodium aluminate ion-conductive electrolyte interfaces.

While other modifications of the invention and variations thereof which may be employed within the scope of the invention have not been described, the invention is intended to include such as may be embraced within the following claims.

What we claim as new and desire to secure by Letters Patent of the United States is:

1. A sealed lithium-reducible gas cell comprises a casing, an anode positioned within the casing, the anode selected from the class consisting of lithium, lithium as an amalgam and lithium in a non-aqueous electrolyte, a cathode positioned within the casing, the cathode comprising a reducible gas in a non-aqueous solvent with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of LiNaO·9Al$_2$O$_3$ of which 1.3 to 85% of the total alkali ion content is lithium.

2. A sealed lithium-reducible gas cell as in claim 1, in which 40 to 60% of the total alkali ion content of the solid lithium-sodium electrolyte composition is lithium.

3. A sealed lithium reducible gas cell as in claim 1, in which 50% of the total alkali ion content of the solid lithium-sodium aluminate electrolyte composition is lithium.

4. A sealed lithium-reducible gas cell as in claim 1, in which the cathode is sulfur dioxide present as a solution in propylene carbonate containing LiClO$_4$ and tetrabutylammonium tetrafluoroborate.

* * * * *